United States Patent [19]

Stern

[11] Patent Number: 4,827,663
[45] Date of Patent: May 9, 1989

[54] AROMATIC CUT-FLOWER SUPPORT

[76] Inventor: Leora R. Stern, 3349 Birch St., Becker, Minn. 55308

[21] Appl. No.: 136,016

[22] Filed: Dec. 21, 1987

[51] Int. Cl.⁴ .............................................. A01G 5/00
[52] U.S. Cl. .................................. 47/41.13; 248/27.8
[58] Field of Search ...................... 248/27.8; 47/41.12, 47/41.13, 48.5

[56] References Cited

U.S. PATENT DOCUMENTS

| | | | |
|---|---|---|---|
| 1,431,679 | 10/1922 | Noda | 47/41.13 |
| 2,298,232 | 10/1942 | Remund | 47/48.5 |
| 2,380,721 | 7/1945 | Brigden | 47/48.5 |
| 2,774,187 | 12/1956 | Smithers | 47/41.12 |
| 2,881,562 | 4/1959 | Ragot | 47/41.13 |
| 3,005,287 | 10/1961 | Dudley | 47/48.5 X |
| 3,304,653 | 2/1967 | Zadarnowski | 47/48.5 |
| 3,477,175 | 11/1969 | Sakamoto | 47/41.13 |
| 3,765,995 | 10/1973 | Perrin | 47/41.13 X |
| 4,167,832 | 9/1979 | Zetterquist et al. | 47/7 X |

FOREIGN PATENT DOCUMENTS

| | | | |
|---|---|---|---|
| 242429 | 9/1965 | Austria | 47/41.13 |
| 937871 | 9/1963 | United Kingdom | 47/41.13 |

Primary Examiner—J. Franklin Foss
Assistant Examiner—David L. Talbott
Attorney, Agent, or Firm—Douglas Tschida

[57] ABSTRACT

A flower stem support member including a water dissolvable cut stem-sustaining and fragrance enhancing mixture. In various alternative embodiments, the support comprises a molded, heavyweight, brad-containing member which supports one or more mixture containing capsules within mating recesses. In other embodiments, molded foam members support the capsules or the fragrance enhancing mixtures are colloidally included in the support or coated onto from beads or cork particles surrounding the vase-mounted flower holder.

10 Claims, 2 Drawing Sheets

AROMATIC CUT-FLOWER SUPPORT

BACKGROUND OF THE INVENTION

The present invention relates to flower arrangement apparatus and, in particular, to an improved stem support including an encapsulated stem-sustaining plant oil mixture.

Botanlsts and florists, over the years, have selectively manipulated the characteristics of a variety of cut flower-producing plants to develop strains exhibiting desirable colorations, stronger stems and disease resistance, among other properties. However, many of such desirable attributes have come at the expense of the plant's natural fragrance, which has also been adversely affected by the fertillizers, herbicides and pesticides applied during growth.

To offset the problem, occasionally, fragrance is added back to a cut flower arrangement by way of commercially synthesized fragrances which are sprayed onto the flower arrangement. Many of such fragrances are supported in an alcohol-based carrier which evaporates upon application, allowing the fragrance to permeate back into the air over a limited time. Commonly, however, such fragrances are lost two to three days after application, although the appearance of the flower may continue for seven to ten days, before wilting occurs.

Accordingly, a need exists for improved fragrance mixtures and methodologies for applying same, whereby the cut flower's fragrance can be maintained commensurate with the life of the flower arrangement itself. It is also desirable that such a mixture prolong the arrangement's useful life.

The present invention accordingly seeks to reintroduce the arrangement's natural fragrances and sustain the useful life of the cut flowers by way of a number of novel stem supports which mount within a vase and include an encapsulated, water-dissolvable, stem-sustaining mixture or are surrounded by an impregnated carrier.

SUMMARY OF THE INVENTION

It is accordingly a primary object of the subject invention to provide an improved cut stem support for prepared flower arrangements.

It is another object of the invention to provide a water-dissolvable capsule including a cut flower-sustaining plant oil mixture.

It is a still further object of the invention to provide the plant oil mixture in a fashion which promotes absorption into the cut flower and the chemical interaction with the flower cells to sustain the flower's arrangement life and emitted fragrance.

It is yet another object of the invention to prolong the flower's life by way of anti-bacterial and other rejuvenating additives.

The foregoing objects, advantages and distinctions of the invention are particularly achieved in a number of alternative embodiments of improved flower stem supports which include water-activated plant oil mixtures. In a preferred embodiment, a heavyweight, molded lead base is constructed to mount within an associated vase and support a plurality of cut flowers impaled on a number of upright brass brads. One or more associated cavities molded into the base support an encapsulated, water-dissolvable plant oil additive mixture.

In one embodiment, at least one concave recess receives a filled pill-like capsule. In another embodiment, a ring-like recess receives a mating oil-filled toroidal capsule. In still other embodiments, a molded foam, stem-receiving member contains a plurality of capsules or else the support is surrounded by a plurality of mixture-coated beads or cork particles impregnated with the mixture. In the latter instances, the support may also be found to support artificial flowers. In still another embodiment, the plant oil additives are molded in colloidal suspension in the support and absorbed over time into the cut flowers.

The above objects, advantages and distinctions of the invention, among other, as well as its construction, will become more apparent upon reference to the following detailed description with respect to the appended drawings. Before referring thereto, it is to be appreciated the following description is made by way of the presently preferred embodiment only which should not be interpreted in limitation of the scope of the invention. To the extent modifications or improvements have been considered, they are described as appropriate.

DESCRIPTION OF THE PREFERRED EMBODIMENT

Figure 1:
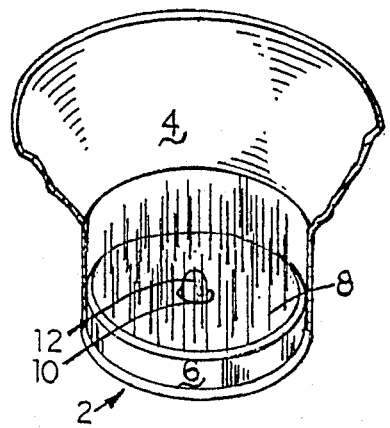
FIG. 1 shows a perspective view in partial cutaway of a circular stem support mounted in a conical vase.
Figure 2:
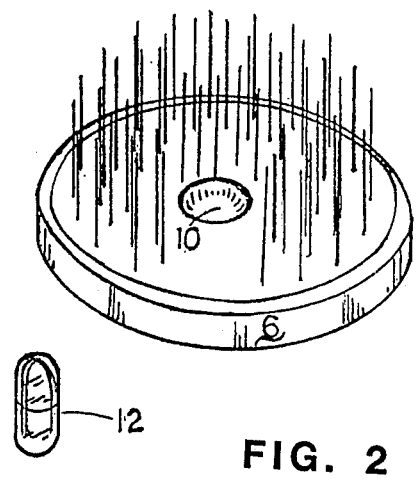
FIG. 2 shows an exploded assembly view in perspective of the stem support of FIG. 1 and plant oil containing capsule.

Referring to FIGS. 1 and 2, respective perspective views are shown in partial cutaway and exploded assembly of an improved cut flower support 2 as it appears when mounted within the bottom of a conforming vase 4. In particular, the stem support 2 comprises a molded, circular lead disk 6 having a flat bottom and supporting of a plurality of brass brads 8. Centrally positioned within the base is a concave recess 10 which is shaped to receive a pill-like capsule 12. Although a single recess 10 is shown, it is to be appreciated multiple recesses 10 might be provided within the base.

The purpose of the support, however, is to restrain the stems of the cut or artificial flowers as they are inserted into the vase and impaled on or between the brads 8. The flowers' relative positions are thus maintainable over time to create a desired arrangement appearance. Thereafter, the prepared arrangement may be refrigerated, prior to sale, to preserve the cut flowers.

Upon receipt of a natural arrangement and with the addition of water, the consumer is able to sustain the appearance and enhance the aromatic properties of the arrangement through the capsule 12's dissolution in the added water. The additive oil mixture, which will be described in greater detail below, is thereafter absorbed into and chemically reacts with the flowers' cells to provide the above-mentioned results. In particular, the oils float on the water and over time are absorbed into the flowers. An improved fragrance is thus obtainable from the floating oils themselves, as well as the petals of the flowers, which through on-going cellular activities, permeate still additional fragrance. The arrangement's overall fragrance is thus enhanced for an effective period longer than that which is otherwise obtainable either with the use of a spray or naturally with the use of water alone.

It is to be appreciated further that others of the additives act to kill bacteria within the water, interact with the stem cells to retard healing of the cut cells and strengthen the petals, thereby prolonging the onset of silting. In these regards and by way of the additive mixtures described hereinafter, a typical arrangement's life can be increased three to five days, over that otherwise obtainable with conventional techniques and additives, before petal wilting is observed, while providing for a relatively constant level of fragrance.

Figure 3:
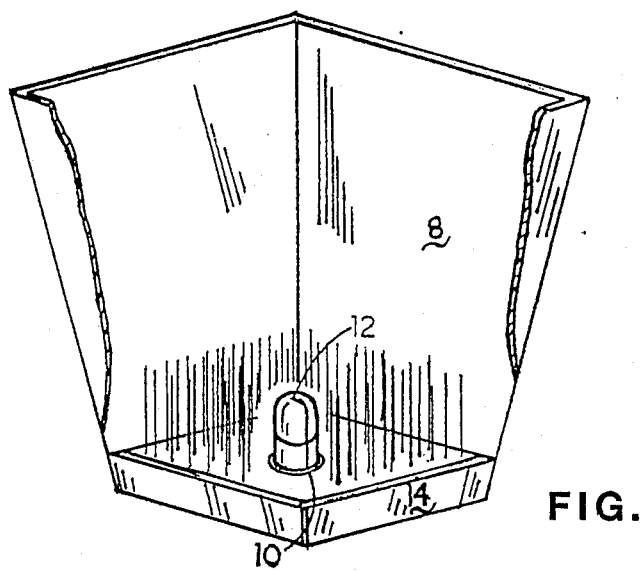
FIG. 3 shows a perspective view in partial cutaway of a square stem support and associated vase.

Turning attention to FIG. 3, a perspective view is shown in partial cutaway of a square-bottomed vase 8 including a square stem support 14, like that of FIGS. 1 and 2, and wherein one or more dissolvable capsules 12 are mounted within mating recesses 10. Depending upon the vase shape, it is to be appreciated a variety of other shaped supports 6 and 14 may be constructed to accommodate the particular vase with which it is used.

Figure 4:
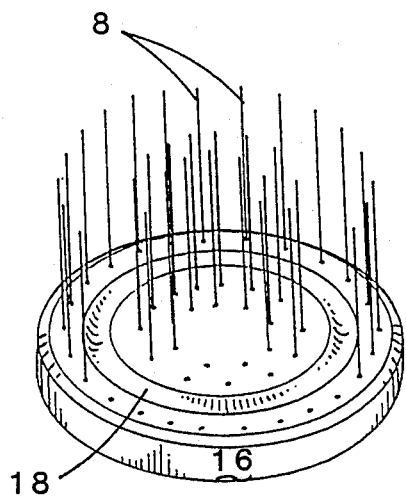
FIG. 4 shows an exploded assembly view of a stem support including a donut-shaped recess and mating capsule.

FIG. 4 shows a perspective view in exploded assembly of a stem support 16 like that of FIGS. 1 and 2, although it provides for a split, toroidal or donut-shaped recess 18 and relative to which the brads 8 are mounted at varying heights so as not to obstruct with the mounting of a mating toroidal capsule 20. Whereas for the embodiment of FIGS. 1 through 3, multiple capsules 12 are employed to provide desirable volumes of additives, the capsule 20 provides for a greater volume of additive sufficient to sustain arrangements of a dozen flowers or more.

As presently constructed, the capsule 20 is formed in two tubularly arcuate halves 20a and 20b of differing cross-sectional diameters such that the ends of one of the arcuate members mount in sealed relation to the other. As with the capsules 12 of FIGS. 1 through 3, the additives, once introduced into the capsule 20, are protected until water is added to the vase, when the capsules 12 and 20 dissolve and release the additives to the water.

Figure 5:
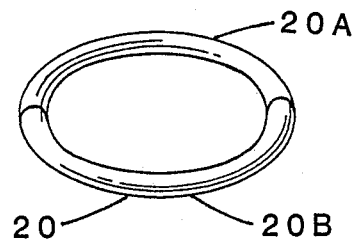
FIG. 5 shows a perspective view in partial cutaway of a molded foam support including a plurality of additive-containing capsules.
Figure 5:
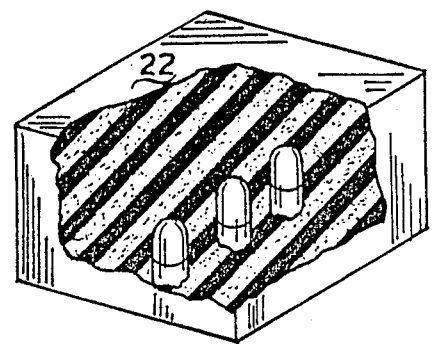

Turning attention next to FIG. 5, a perspective view is shown in partial cutaway of a molded foam stem support member 22 wherein a number of additive-containing capsules 12 are mounted. Such foam blocks are readily available under the trade name Oasis and the composition of which foam readily accommodates the physical insertion of the capsules 12 without the necessity of molding corresponding cavities therein. That is, the capsules need merely be pushed into the foam, with the additives again being released to the flowers with the absorption of the water into the foam. Otherwise, the flower stems pierce the foam and are compressively secured thereto.

In lieu of physically inserting the capsules into the foam, it is also contemplated that additive mixture coated beads may be impregnated into the foam or the oil mixtures may be added directly to the mixture from which the foam is created to colloidally trap the additives within the foam. Such additives later would be introduced to the water and flowers by timed dissolution from the foam. Similarly, the oil mixture might be absorbed into cork particles.

Figure 6:
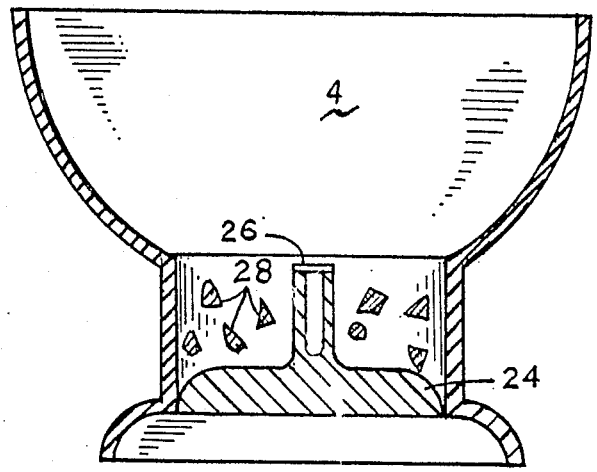
FIG. 6 shows a front elevation view in partial cutaway of an artificial flower support and surrounding fragrance carrier.

In this latter regard, attention is directed to FIG. 6 wherein a molded artificial flower support 24 is shown. This support includes a vertical tubular portion 26 (shown in cutaway) which supports a mating silk or other artificial flower. Surrounding the support 24 are a plurlaity of oil mixture impregnated cork particles 28. Such particles emit the natural fragrance of the oil mixture which is selected to match the prepared arrangement. Once the fragrance is lost, the particles 28 may be replaced or re-soaked in the oil mixture.

Turning attention next to Formulas 1 and 2 below, various natural plant oil mixtures are disclosed relative to their primary ingredients and the relative percentage quantities of each. Such oils are extracted from organically grown flowers and herbs and are of high purity concentrations. The mixtures, in turn, have been succcessfuylly applied by applicant with a variety of flowers (e.g. roses, carnations, irises, etc.) and been found to prolong the life of the arrangements with which they've been used by three to five days over a comparable arrangement which included only tap water or other commercially available water-based additives.

|  | Ingredient | Relative Concentration by Volume |
|---|---|---|
| Formula #1 | Wild Rose | 20% to 25% |
|  | Morning Glory | 20% to 25% |
|  | Nasturtlum | 5% to 10% |
|  | Yarrow | 5% to 10% |
|  | Lavender | 1% to 5% |
|  | Lotus | 1% to 5% |
|  | Geranium | 1% to 5% |
|  | Basil | 5% to 10% |
| Formula #2 | Jasmine | 30% to 45% |
|  | Bergamot | 15% to 20% |
|  | Frankincense | 15% to 20% |
|  | Melissa | 5% to 10% |
|  | Neroll | 5% to 10% |
|  | Rose (bulgarian) | 5% to 10% |
|  | Myrrh | 5% to 10% |

Formula #1 is comprised of a number of domestically available, absolute or basic plant oils, which are derived upon the reduction of related plant forms. Alternatively, Formula #2 is comprised of a number of oils which are not domestically available in the U.S.

In particular, Formula #1 includes wild rose oil which is an antiseptic and which, along with the lavender oil, enhances the flowers' aroma and rejuvenates cell activity. The morning glory, nasturtium and lotus oils maintain and stabilize the cellular activities of the flowers; while yarrow and the geranium oils are believed to strengthen the flowers' stems and prolong the petal life before wilting. Still another additive which may be included is basil and which may be added in the concentrations shown to kill undesirable bacteria or fungi within the water.

Referring next to Formula #2, it includes jasmine and neroli oils which maintain the flowers' cellular actions and stimulate the elimination of damaged and old cells; bergamot and melissa promote absorption and retard stem healing in spite of the loss of the root system; and frankincense enhances the flowers' fragrance.

By volume, it is to be further appreciated that relatively small quantities of the foregoing plant oils are required to support arrangements of up to a dozen flowers over a two week period, before petal wilting occurs.

Although too at present only pure oils are used, it is anticipated the oils can be diluted in a variety of carriers which do not adversely affect the mixture's desired fragrance and flower sustaining properties. Still further, it is to be understood the oils can be coated onto or soaked into appropriate solid carriers, such as porous beads or cork particles. The beads, in turn, may be sprinkled either into the vase or impregnated into the support, such as foam support 22, with a timed release thereafter occurring as the water reacts with the beads to release the oils for absorption. For a silk flower arrangement, as in FIG. 6, the fragrance would be emitted directly from the cork particles 28.

While the invention has beed described with respect to its presently preferred embodiment and various alternative embodiments, it is to be appreciated still other embodiments might suggest themselves to those of skill in the art. Accordingly, the invention should be interpreted to include all those equivalent embodiments within the spirit and scope of the following claims.

What is claimed is:

1. A flower support comprising:
   (a) a relatively heavyweight base member formed to rest on an interior bottom surface of an open-topped flower vase and having an upper surface including at least one cavity opening to the upper surface of the base member;
   (b) a plurality of pointed brad members secured to said base member and extending in upright relation to said upper surface of the base member, except in the region of said cavity; and
   (c) a gelatinous water soluble capsule formed to mount inmating relation with said cavity in exposed relation to the interior of said vase, said capsule including a mixture of fragrance and flower sustaining plant oils which are released upon the addition of water to said vase and the dissolving of said capsule.

2. Apparatus as set forth in claim 1 wherein said base member is molded from lead and includes a plurality of brass brads.

3. Apparatus as set forth in claim 1 wherein said brads are positioned at varying heights relative to one another.

4. Apparatus as set forth in claim 1 wherein said capsule comprises at least first and second open-ended sealably mating portions.

5. Apparatus as set forth in claim 4 wherein said capsule is of a toroidal shape.

6. Apparatus as set forth in claim 4 wherein said capsule is of an elongated ovular shape.

7. Apparatus as set forth in claim 1 wherein said mixture is comprised of a plurality of plant oils which retard stem healing, add fragrance and retard bacterial growth.

8. Apparatus as set forth in claim 7 wherein said mixture includes oils of wild rose, morning glory, nasturtuim, yarrow, lavender, lotus, geranium and basil.

9. Apparatus as set forth in claim 7 wherein said mixture includes oils of jasmine, bergamot, frankincense, melissa and neroli.

10. A cut flower support comprising:
    (a) a base member formed to mount in the interior surface of an open-topped vase and including at least one cavity opening to at least one external surface of said base member;
    (b) a plurality of pointed brad members projecting from said base member, except in the region of said cavity; and
    (c) a dissolvable container shaped to mount in mating relation with said cavity and in exposed relation to the interior of said vase, said container including a fragrance supporting carrier which fragrance is released upon the addition of a container dissolving agent to said vase.

* * * * *